(12) United States Patent
German et al.

(10) Patent No.: US 7,605,707 B2
(45) Date of Patent: Oct. 20, 2009

(54) TELECOMMUNICATIONS PATCHING SYSTEM THAT UTILIZES RFID TAGS TO DETECT AND IDENTIFY PATCH CORD INTERCONNECTIONS

(75) Inventors: Michael G. German, Secaucus, NJ (US); Golam Mabud Choudhury, Warren, NJ (US); Daniel Warren Macauley, Fishers, IN (US); Danny L. Satterthwaite, Allen, TX (US); Peter T. Tucker, Dallas, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 323 days.

(21) Appl. No.: 11/295,349

(22) Filed: Dec. 6, 2005

(65) Prior Publication Data

US 2006/0148279 A1    Jul. 6, 2006

Related U.S. Application Data

(60) Provisional application No. 60/608,962, filed on Dec. 6, 2004.

(51) Int. Cl.
*G08B 13/14* (2006.01)
(52) U.S. Cl. .................. 340/572.8; 340/572.7; 340/687
(58) Field of Classification Search .............. 340/572.1, 340/572.4, 572.7, 572.8, 568.1, 568.2, 687, 340/10.1, 10.42; 235/451, 375, 385, 492; 236/492, 451, 375, 385; 709/200
See application file for complete search history.

(56) References Cited

U.S. PATENT DOCUMENTS

| | | | |
|---|---|---|---|
| 5,483,467 A * | 1/1996 | Krupka et al. | ............. 709/200 |
| 6,002,331 A | 12/1999 | Laor | |
| 6,222,908 B1 | 4/2001 | Bartolutti et al. | |
| 6,285,293 B1 | 9/2001 | German et al. | |
| 6,330,307 B1 | 12/2001 | Bloch et al. | |
| 6,424,710 B1 | 7/2002 | Bartolutti et al. | |
| 6,784,802 B1 | 8/2004 | Stanescu | |
| 7,170,393 B2 | 1/2007 | Martin | |
| 7,193,422 B2 | 3/2007 | Velleca et al. | |
| 7,374,101 B2 * | 5/2008 | Kaneko | ................ 235/492 |
| 2006/0049942 A1 * | 3/2006 | Sakama et al. | ........... 340/572.1 |

FOREIGN PATENT DOCUMENTS

JP        2005/235615    *    2/2005

OTHER PUBLICATIONS

International Search Report and Written Opinion of the International Searching Authority corresponding to PCT/US2005/044202, mailed May 3, 2006.

* cited by examiner

*Primary Examiner*—Van T. Trieu
(74) *Attorney, Agent, or Firm*—Myers Bigel Sibley & Sajovec (57) ABSTRACT

A telecommunications patching system includes a patch panel having a plurality of connector ports, and having an RFID reader and RF antennas associated with the connector ports. A plurality of patch cords are configured to selectively interconnect pairs of the connector ports. Each patch cord has opposite ends and a respective connector secured to each end that is configured to be removably secured within a connector port. Each connector of a respective patch cord includes an RFID tag. The RFID tags for a respective patch cord have the same unique identifier stored therewithin. The RF antenna associated with a connector port emits RF signals that cause a patch cord connector RFID tag to transmit its identifier. Each RF antenna detects the transmitted identifier of a patch cord connector RFID tag when the respective patch cord connector is inserted within, and removed from, a respective one of the connector ports.

24 Claims, 5 Drawing Sheets

TELECOMMUNICATIONS PATCHING SYSTEM THAT UTILIZES RFID TAGS TO DETECT AND IDENTIFY PATCH CORD INTERCONNECTIONS

RELATED APPLICATION

This application claims the benefit of and priority to U.S. Provisional Patent Application No. 60/608,962 filed Dec. 6, 2004, the disclosure of which is incorporated herein by reference as if set forth in its entirety.

FIELD OF THE INVENTION

The present invention relates generally to telecommunications systems and, more particularly, to telecommunications patching systems.

BACKGROUND OF THE INVENTION

Many businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers may also terminate within a telecommunications closet.

A patching system is typically used to interconnect the various telecommunication lines within a telecommunications closet. In a telecommunications patching system, all of the telecommunication lines are terminated within a telecommunications closet in an organized manner. The organized terminations of the various lines are provided via the structure of the telecommunications closet. A mounting frame having one or more racks is typically located in a telecommunications closet. The telecommunications lines terminate on the racks, as is explained below.

Figure 1:
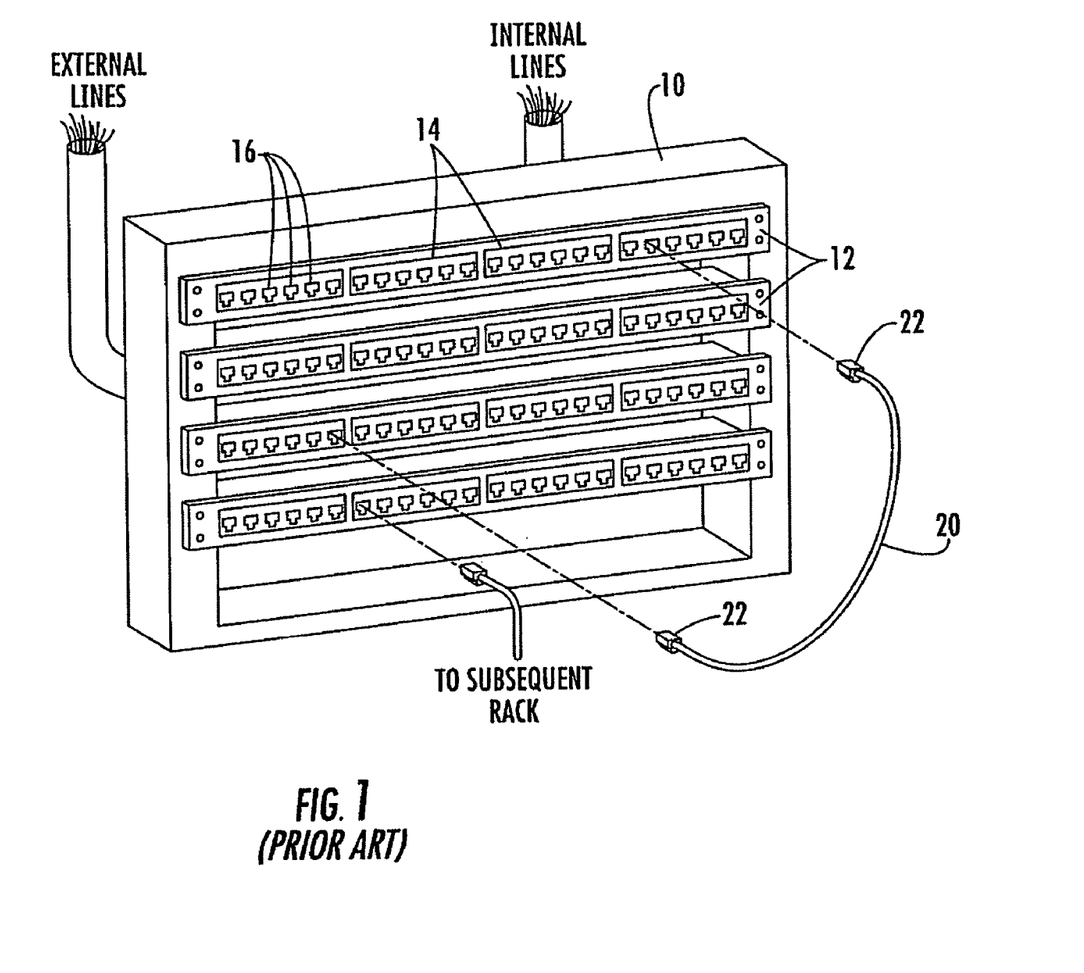
FIG. 1 is a perspective view of a typical prior art telecommunications rack assembly containing multiple patch panels with connector ports that are selectively interconnected by patch cords.

Referring to FIG. 1, a typical prior art rack 10 is shown. The rack 10 retains a plurality of patch panels 12 that are mounted to the rack 10. On each of the patch panels 12 are located port assemblies 14. The illustrated port assemblies 14 each contain six telecommunication connector ports 16 (e.g., RJ-45 ports). Other types of patch panels are known, including patch panels with optical fiber ports (e.g., SC, ST and LC ports) and 110 copper wire ports.

Each of the different telecommunication connector ports 16 is hard wired to one of the telecommunications lines. Accordingly, each telecommunications line is terminated on a patch panel 12 in an organized manner. In small patch systems, all telecommunications lines may terminate on the patch panels of the same rack. In larger patch systems, multiple racks may be used, wherein different telecommunications lines terminate on different racks.

In the illustrated embodiment of FIG. 1, interconnections between the various telecommunications lines are made using patch cords 20. Both ends of each patch cord 20 are terminated with connectors 22, such as an RJ-45 or RJ-11 telecommunications connector. One end of a patch cord 20 is connected to a connector port 16 of a first telecommunications line and the opposite end of the patch cord 20 is connected to a connector port 16 of a second telecommunications line. By selectively connecting the various lines with patch cords 20, any combination of telecommunications lines can be interconnected.

In many businesses, employees are assigned their own computer network access number exchange so that the employee can interface with a main frame computer or computer network. When an employee changes office locations, it may not be desirable to provide that employee with new exchange numbers. Rather, to preserve consistency in communications, it may be preferred that the exchanges of the telecommunication connection ports in the employee's old office be transferred to the telecommunications ports in the employee's new office. To accomplish this task, patch cords in a telecommunication closet are rearranged so that the employee's old exchanges are now received in his/her new office.

As employees move, change positions, and/or add and subtract lines, the patch cords in a typical telecommunications closet are rearranged quite often. The interconnections of the various patch cords in a telecommunications closet are often logged in either a paper or computer based log. However, technicians may neglect to update the log each and every time a change is made. Inevitably, the log is less than 100% accurate and a technician has no way of reading where each of the patch cords begins and ends. Accordingly, each time a technician needs to change a patch cord, the technician manually traces that patch cord between two connector ports. To perform a manual trace, the technician locates one end of a patch cord and then manually follows the patch cord until he/she finds the opposite end of that patch cord. Once the two ends of the patch cord are located, the patch cord can be positively identified.

It may take a significant amount of time for a technician to manually trace a particular patch cord, particularly within a collection of other patch cords. Furthermore, manual tracing may not be completely accurate and technicians may accidentally go from one patch cord to another during a manual trace. Such errors may result in misconnected telecommunication lines which must be later identified and corrected. Also, it may be difficult to identify the correct port to which a particular patch cord end should be connected or disconnected. Thus, ensuring that the proper connections are made can be very time-consuming, and the process is prone to errors in both the making of connections and in keeping records of the connections. Accordingly, a need exists for accurately and quickly tracing, detecting and identifying the ends of patch cords in a telecommunications closet. A need also exists for accurately and quickly knowing which ports are connected by patch cords.

SUMMARY OF THE INVENTION

In view of the above discussion, a telecommunications patching system that facilitates rapid and accurate patch cord tracing are provided. According to an embodiment of the present invention, a patch panel having a plurality of connector ports includes an RFID reader and a plurality of RF antennas. Each RF antenna is associated with one or more patch panel connector ports. A plurality of patch cords are configured to selectively interconnect pairs of the connector ports. Each patch cord has opposite ends and a respective connector secured to each end that is configured to be removably secured within a connector port. Each connector of a respective patch cord also includes an RFID tag. The RFID tags for a respective patch cord have the same unique identifier stored therewithin. The RF antenna associated with a patch panel connector port emits RF signals that are configured to cause a patch cord connector RFID tag to transmit its identifier. Each RF antenna detects the transmitted identifier of a patch cord connector RFID tag when the respective patch cord connector is inserted within, and removed from, a connector port associated with a respective RF antenna. The detected RFID tag identifier is then transmitted to the RFID reader and stored within a database that logs patch cord connectivity.

According to other embodiments of the present invention, an RFID reader and RF antenna are associated with a communications port of a network device, such as a switch, a router, etc. A patch cord is configured to selectively interconnect one of the connector ports of a telecommunications system patch panel with the network device communications port. The patch cord connectors include an RFID tag having the same unique identifier stored therewithin. Because both connectors have the same identifier, a telecommunications system can determine that the network device communications port is patched to a specific port on a patch panel.

Embodiments of the present invention may be utilized with any type of communications technology including, but not limited to, copper wire communications technologies and fiber optic communications technologies. For example, embodiments of the present invention may be utilized with patch panels having RJ-11 ports, RJ-45 ports, with patch panels having optical fiber ports (e.g., SC, ST and LC ports), and with patch panels having copper wire ports (e.g., 110 copper ports).

BRIEF DESCRIPTION OF THE DRAWINGS

FIGS. 3A and 3B are perspective views of patch cord connectors, according to embodiments of the present invention, wherein FIG. 3A illustrates an RFID tag antenna coil having an axis that is substantially normal to an axis of the cord connected to the patch cord connector, and wherein FIG. 3B illustrates an RFID tag antenna coil having an axis that is substantially parallel with an axis of the cord connected to the patch cord connector.

DETAILED DESCRIPTION OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

In the drawings, the thickness of lines, and elements may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Figure 2:
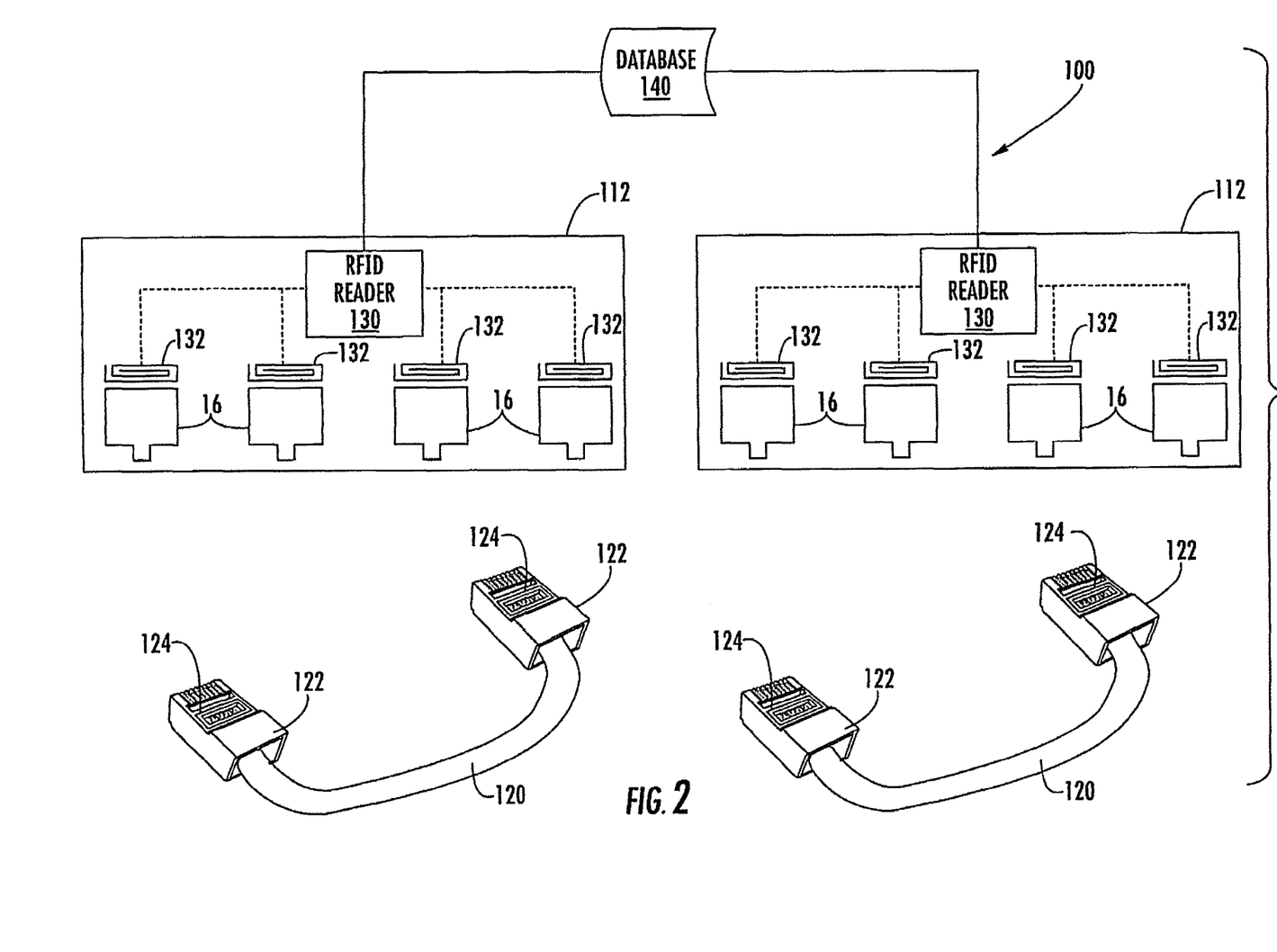
FIG. 2 is a block diagram of a telecommunications patching system, according to embodiments of the present invention.

Referring now to FIG. 2, a telecommunications patching system 100, according to embodiments of the present invention, is illustrated and includes patch panels 112 with multiple connector ports (e.g., RJ-45 ports, etc.) 16, a plurality of patch cords 120, an RFID reader 130 for each patch panel 112, and a database 140 that monitors and logs patch cord interconnections with the connector ports 16. Each patch cord 120 is configured to selectively interconnect pairs of the connector ports 16, as would be understood by those skilled in the art. Each patch cord 120 includes opposite ends and a respective connector 122 secured to each end, as illustrated. Each connector 122 is configured to be removably secured within a connector port 16 in a patch panel 112. Each patch cord connector 122 includes an RFID (Radio Frequency IDentification) tag 124. Each RFID tag 124 includes an antenna and a microchip which stores a unique identifier (e.g., numbers, alphanumeric characters, etc.) for the connector. The RFID tags for a respective patch cord have the same unique identifier stored on respective microchips therewithin. Each RFID tag 124 draws power from the RF field created by an RF antenna when a connector to which the RFID tag is attached is inserted within a connector port 16, as described below. The RFID tag 124 uses this power to power the circuits of its microchip.

In the illustrated embodiment of FIG. 2, each RFID reader 130 includes a plurality of RF antennas 132. Each RF antenna 132 is powered by an RFID reader 130 to generate an RF field. When an RFID tag 124 on a patch cord connector passes through this RF field, the RFID tag antenna is excited by the RF field. The RFID tag microchip then modulates waves containing information (i.e., a unique identifier) stored within the RFID tag microchip and the RFID tag antenna broadcasts these waves. The RF antenna 132 detects the broadcast information and communicates this information to a processor associated with an RFID reader 130. The processor converts the received waves into digital data and transmits the data to the database 140. A processor associated with an RFID reader 130 may be virtually any type of processor, such as an 8-bit processor, and may retain a history of events within memory. Accordingly, a patch cord connector 122 can be identified when inserted within and removed from a connector port 16 on any of the patch panels 112. Because the connectors of each patch cord 120 have the same unique identifier, the telecommunications patching system 100 tracks the communications ports 16 to which a particular patch cord 120 is connected.

RFID tags typically resonate within a range of about 55 kHz to about 85 kHz. However, it is understood that RFID tags 124 resonating at other frequencies may also be identified by RF antennas 132, according to embodiments of the present invention. RFID tags that resonate at any frequency may be utilized in accordance with embodiments of the present invention. An exemplary frequency is 125 kHz. RF antennas and their use in detecting the proximity of RFID tags and for interrogating RFID tags for information are well understood by those of skill in the art and need not be discussed further herein.

Figure 4:
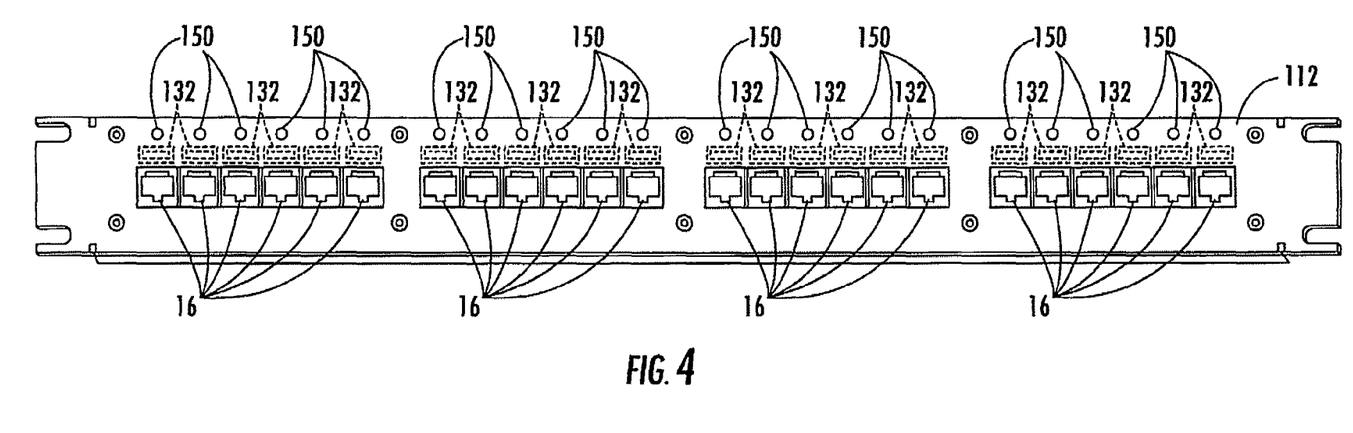
FIG. 4 is a front plan view of a patch panel, according to embodiments of the present invention, and wherein each RF antenna is associated with a respective connector port.

Each RF antenna 132 in the embodiment of FIG. 2 is associated with a respective connector port 16. As illustrated in FIG. 4, each RF antenna 132 may be positioned adjacent to a respective communications port 16. For example, the RF antennas 132 may be attached (e.g., adhesively attached, etc.) to the outer surface of the patch panels 112 and to the outer surface of network equipment (as described below and illustrated in FIG. 6). Alternatively, the RF antennas 132 may be embedded within the material of the patch panels 112, or may be located inside of the patch panels 112 (e.g., in a system controller such that the RFID reader can be shared by multiple patch panels). According to embodiments of the present invention, an RFID reader 130 may be attached on or within a respective patch panel 112. Alternatively, an RFID reader 130 may be located remotely from a respective patch panel 112.

Figure 3A:
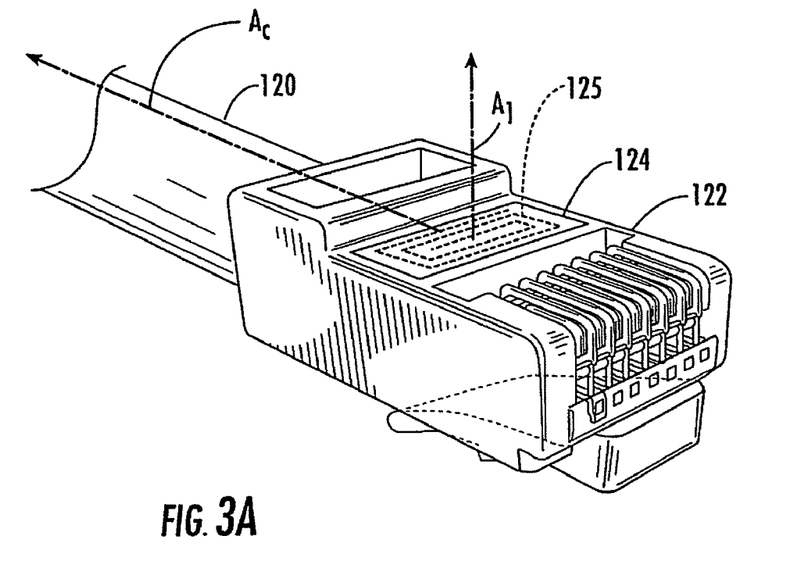
Figure 3B:
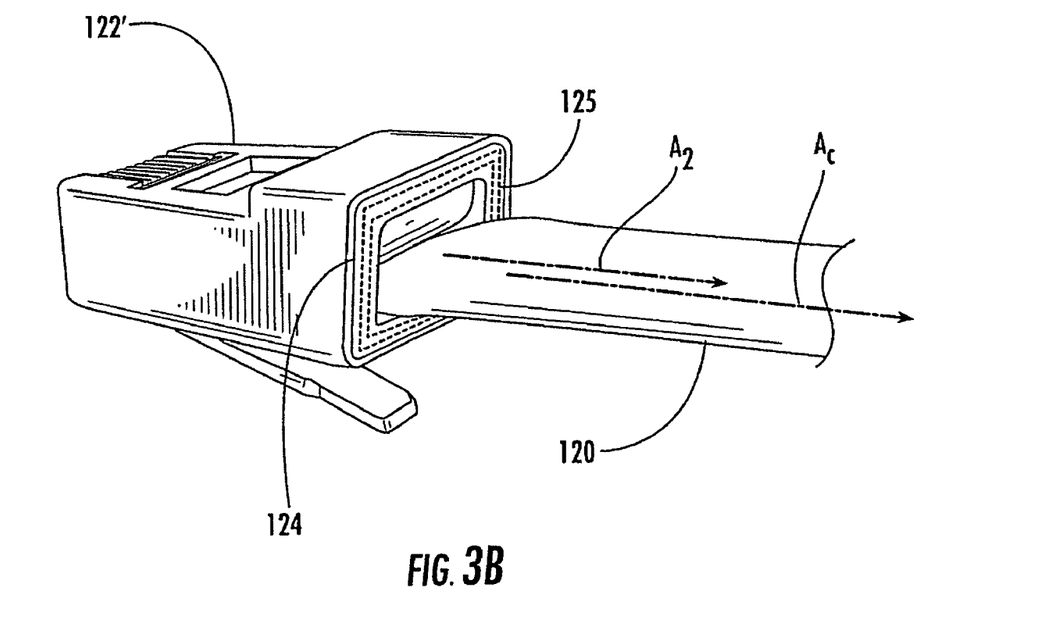

RFID tags 124 may be attached to patch cord connectors 122 in various ways known to those skilled in the art. In addition, RFID tags 124 may be attached to patch cord connectors 122 in various locations and orientations. For example, as illustrated in FIG. 3A, an RFID tag antenna coil 125 has an axis $A_1$ that is substantially normal to the axis $A_c$ of the cord 120 connected to the patch cord connector 122. According to other embodiments of the present invention, as illustrated in FIG. 3B, an RFID tag antenna coil 125 has an axis $A_2$ that is substantially parallel with the axis $A_c$ of the cord 120 connected to the patch cord connector 122. It is desirable that electromagnetic field lines of an RFID tag antenna coil penetrate as much of the area of an RFID tag as possible.

Figure 5:
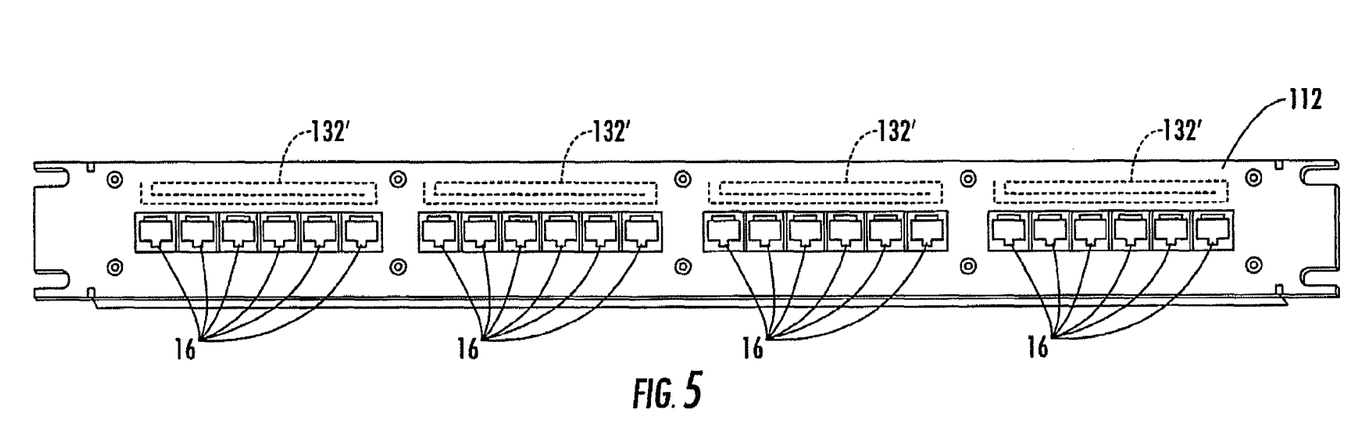
FIG. 5 is a front plan view of a patch panel, according to embodiments of the present invention, and wherein RF antennas are associated with multiple connector ports.

According to other embodiments of the present invention, an RF antenna 132 may be associated with more than one communications port 16 of a patch panel 112. For example, as illustrated in FIG. 5, each RF antenna 132' is associated with six connector ports 16. Thus, each RF antenna 132' is configured to interrogate and read information from an RFID tag 124 of a connector 122 inserted within or removed from any of six connector ports 16 with which the RF antenna 132' is associated. Each RFID antenna coil has a specific electromagnetic field profile. Depending on a position at which a patch cord connector 122 with an RFID tag 124 is introduced into an electromagnetic field, signal strength generated by an RFID tag can be different. When one RFID antenna 132' is shared by several connector ports (4, 6, 8, etc), each connector port can have a corresponding signal strength in such electromagnetic field, thus, allowing for an easy way to identify a specific connector port 16 that is occupied by a specific patch cord connector 122 with an RFID tag 124.

According to other embodiments of the present invention, a visual indicator (e.g., an LED indicator) may be associated with each RF antenna 132 for the purpose of indicating the presence of a patch cord connector 122 within a respective connector port 16. FIG. 4 illustrates respective visual indicators 150 positioned adjacent to each connector port 16. When a patch cord connector 122 is inserted within a connector port 16, the visual indicator 150 adjacent thereto illuminates to indicate the presence of a patch cord connector 122. The visual indicators 150 can facilitate the tracing of patch cords between various connector ports.

According to other embodiments of the present invention, tracing circuitry may be associated with each port in a patch panel. For example, tracing interface modules may be attached to patch panels as described in U.S. Pat. No. 6,285, 293, which is incorporated herein by reference in its entirety. A trace button is associated with each port. When a trace button associated with one end of a patch cord is pressed, the opposite end of the patch cord is located and a visual indicator (e.g., an LED indicator) at the port in which the opposite end of the patch cord is located is illuminated. This enables a technician to easily find the opposite end of a selected patch cord without having to manually trace the patch cord from end to end.

Figure 6:
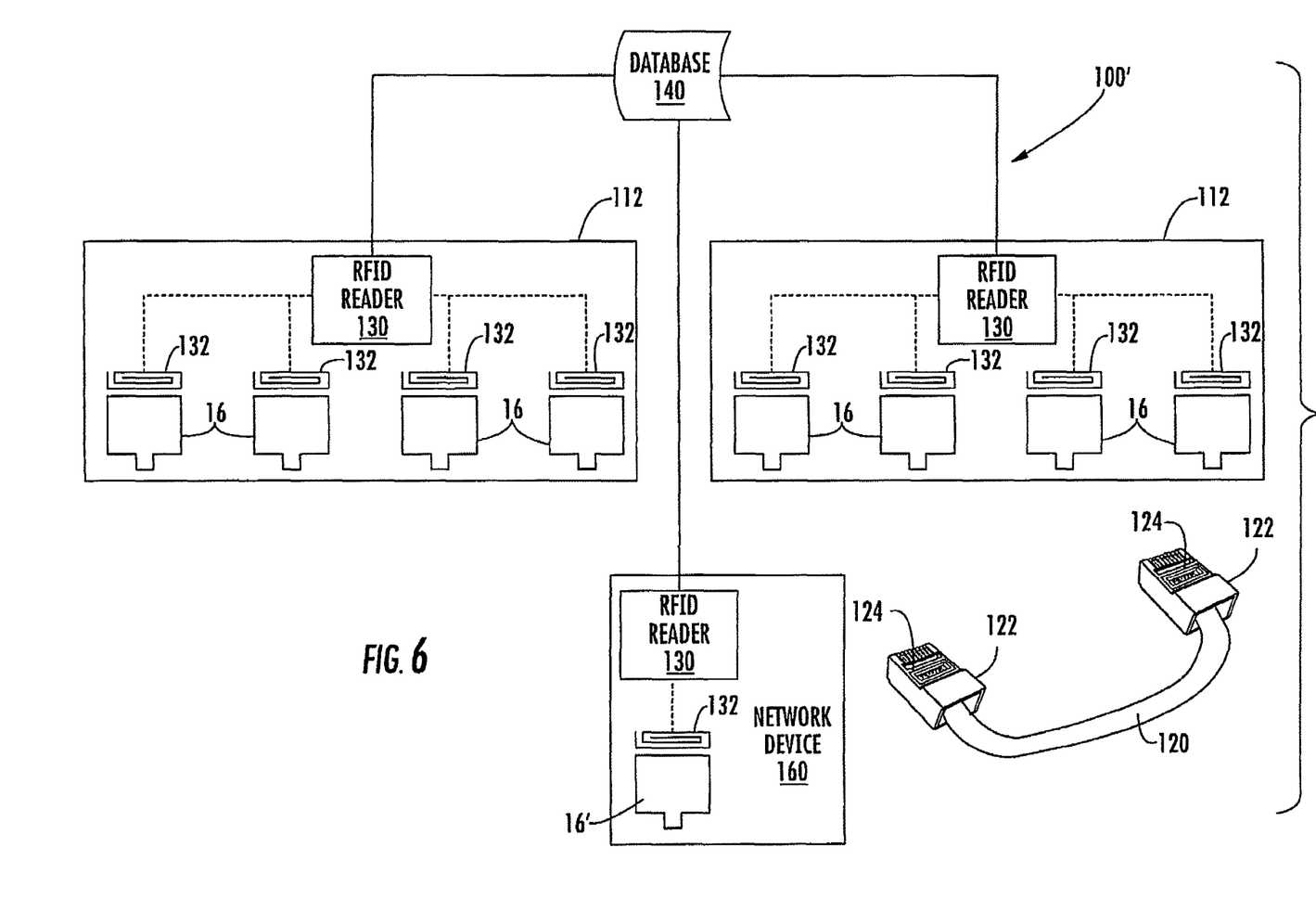
FIG. 6 is a block diagram of a telecommunications patching system, according to embodiments of the present invention.

Referring now to FIG. 6, a telecommunications patching system 100', according to embodiments of the present invention, is illustrated and includes one or more patch panels 112 with multiple connector ports (e.g., RJ-45 ports, etc.) 16, a network device 160 (e.g., router, switch, hub, etc.) having a communications port 16', a patch cord 120, and RFID readers 130 that monitor and log patch cord interconnections with the connector ports 16 and the network device communications port 16'. In the illustrated embodiment, an RF antenna 132 is associated with each patch panel connector port 16 and with the network device communications port 16'. The patch cord 120 is configured to selectively interconnect one of the connector ports 16 with the network device communications port 16'. The patch cord connectors 122 include an RFID tag 124 having the same unique identifier stored therewithin, as described above with respect to FIG. 2. Because both connectors have the same identifier, the telecommunications patching system 100' can determine that the network device communications port 16' is patched to a specific port 16 on a patch panel 112.

According to embodiments of the present invention, RFID tags can be factory installed or patching systems can be retrofitted in the field. When RFID tags are factory installed, they can be programmed with information that indicates manufacturing date, operator's ID, factory code, etc. If an RFID tag has read/write capabilities, then additional information could be added to the RFID tag in the field. For example, transmission performance test data could be added to factory pre-programmed information.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A telecommunications patching system, comprising:
    a patch panel comprising a plurality of connector ports;
    a plurality of patch cords configured to selectively interconnect pairs of the connector ports, wherein each patch cord comprises opposite ends and a respective connector secured to each end, wherein each connector is configured to be removably secured within a connector port, and wherein each connector of a respective patch cord comprises an RFID tag, and wherein the RFID tags for a respective patch cord have the same unique identifier stored therewithin;

an RFID reader; and an RF antenna associated with at least one of the connector ports, wherein the RF antenna emits RF signals configured to cause a patch cord connector RFID tag to transmit its identifier when excited by emitted RF signals, wherein the RF antenna detects the transmitted identifier of a patch cord connector RFID tag when a patch cord connector is inserted within, and removed from, one of the connector ports, and wherein the RF antenna transmits detected RFID tag identifiers to the RFID reader, wherein each connector port comprises a visual indicator, a manual signal button and tracing circuitry, and wherein when a manual signal button for a connector port containing an end of a patch cord is activated by a user, the tracing circuitry locates a connector port in which an opposite end of the patch cord is located and illuminates a respective visual indicator at the located connector port.

2. The telecommunications patching system of claim 1, further comprising a database that monitors and logs patch cord interconnections with the connector ports, and wherein the RFID reader is in communication with the database.

3. The telecommunications patching system of claim 1, further comprising a plurality of RF antennas, wherein each RF antenna is associated with a respective one of the connector ports, wherein each RF antenna emits RF signals configured to cause a patch cord connector RFID tag to transmit its identifier when excited by emitted RF signals, wherein each RF antenna detects transmitted identifiers of patch cord connector RFID tags when a patch cord connector is inserted within, and removed from, a respective one of the connector ports, and wherein each RF antenna transmits detected RFID tag identifiers to the RFID reader.

4. The telecommunications patching system of claim 3, wherein each RF antenna comprises an LED indicator that indicates the presence of a patch cord connector within a respective connector port.

5. The telecommunications patching system of claim 1, wherein the RF antenna is attached to the patch panel.

6. The telecommunications patching system of claim 1, wherein each one of the plurality of RF antennas is attached to the patch panel adjacent a respective connector port.

7. The telecommunications patching system of claim 1, wherein the RFID reader is attached to the patch panel.

8. The telecommunications patching system of claim 1, wherein the RFID tag for a patch cord connector comprises an antenna coil that defines an axis that is substantially parallel with an axis of a cord connected to the patch cord connector.

9. The telecommunications patching system of claim 1, wherein the RFID tag for a patch cord connector comprises an antenna coil that defines an axis that is substantially normal to an axis of a cord connected to the patch cord connector.

10. The telecommunications patching system of claim 1, wherein the RF antenna is associated with more than one of the plurality of connector ports, and wherein each of the more than one of the plurality of connector ports comprises a corresponding electromagnetic field signal strength to identify which of the more than one of the plurality of connector ports that the patch cord connector is inserted within.

11. A telecommunications patching system, comprising:
a patch panel comprising a plurality of connector ports;
a plurality of patch cords configured to selectively interconnect pairs of the connector ports, wherein each patch cord comprises opposite ends and a respective connector secured to each end, wherein each connector is configured to be removably secured within a connector port, and wherein each connector of a respective patch cord comprises an RFID tag, and wherein the RFID tags for a respective patch cord have the same unique identifier stored therewithin;
an RFID reader; and
a plurality of RF antennas, wherein each RF antenna is attached to the patch panel adjacent a respective one of the connector ports, wherein each RF antenna emits RF signals configured to cause a patch cord connector RFID tag to transmit its identifier when excited by emitted RF signals, wherein each RF antenna detects transmitted identifiers of patch cord connector RFID tags when a patch cord connector is inserted within, and removed from, a respective one of the connector ports, and wherein each RF antenna transmits detected RFID tag identifiers to the RFID reader,
wherein the RFID tag for a patch cord connector comprises an antenna coil that defines an axis that is substantially parallel with an axis of a cord connected to the patch cord connector, and
wherein each connector port comprises a manual signal button and tracing circuitry, and wherein when a manual signal button for a connector port containing an end of a patch cord is activated by a user, the tracing circuitry locates a connector port in which an opposite end of the patch cord is located.

12. The telecommunications patching system of claim 11, further comprising a database that monitors and logs patch cord interconnections with the connector ports, and wherein the RFID reader is in communication with the database.

13. The telecommunications patching system of claim 11, wherein each RF antenna comprises an LED indicator that indicates the presence of a patch cord connector within a respective connector port.

14. The telecommunications patching system of claim 11, wherein the RFID reader is attached to the patch panel.

15. The telecommunications patching system of claim 11, wherein the RFID tag for a patch cord connector comprises an antenna coil that defines an axis that is substantially normal to an axis of a cord connected to the patch cord connector.

16. The telecommunications patching system of claim 11, wherein each connector port comprises a visual indicator, and wherein a respective visual indicator at the located connector port is configured to illuminate responsive to the tracing circuitry.

17. A telecommunications patching system, comprising:
a patch panel comprising a plurality of connector ports;
a communications network device comprising a communications port;
a patch cord configured to selectively interconnect one of the connector ports with the network device communications port, wherein the patch cord comprises opposite ends and a respective connector secured to each end, and wherein each connector has an RFID tag with the same unique identifier stored therewithin;
an RFID reader;
a first RF antenna associated with the connector ports, wherein the first RF antenna emits RF signals configured to cause a patch cord connector RFID tag to transmit its identifier when excited by the emitted RF signals, wherein the first RF antenna detects the transmitted identifier of a patch cord connector RFID tag when a patch cord connector is inserted within, and removed from, one of the connector ports, and wherein the first RF antenna transmits detected RFID tag identifiers to the RFID reader; and a second RF antenna associated with the network device communications port, wherein the second RF antenna emits RF signals configured to cause a patch cord connector RFID tag to transmit its identifier when excited by the emitted RF signals, wherein the second RF antenna detects the transmitted identifier of a patch cord connector RFID tag when a patch cord connector is inserted within, and removed from, the network device communications port, and wherein the second RF antenna transmits detected RFID tag identifiers to the RFID reader, wherein at least one of the connector ports comprises a manual signal button and tracing circuitry, and wherein when a manual signal button for a connector port containing an end of a patch cord is activated by a user, the tracing circuitry locates a connector port in which an opposite end of the patch cord is located.

18. The telecommunications patching system of claim 17, further comprising a database that monitors and logs patch cord interconnections with the connector ports and with the network device communications port, and wherein the RFID reader is in communication with the database.

19. The telecommunications patching system of claim 17, wherein the first RF antenna is attached to the patch panel.

20. The telecommunications patching system of claim 17, wherein the second RF antenna is attached to the network device.

21. The telecommunications patching system of claim 20, wherein the second RF antenna comprises an LED indicator that indicates the presence of a patch cord connector within the network device communications port.

22. The telecommunications patching system of claim 17, wherein the RFID reader is attached to the patch panel.

23. The telecommunications patching system of claim 17, wherein the RFID tag for a patch cord connector comprises an antenna coil that defines an axis that is substantially parallel with an axis of a cord connected to the patch cord connector.

24. The telecommunications patching system of claim 17, wherein the RFID tag for a patch cord connector comprises an antenna coil that defines an axis that is substantially normal to an axis of a cord connected to the patch cord connector.

* * * * *